United States Patent [19]
Finkel et al.

[11] 3,791,791
[45] Feb. 12, 1974

[54] METHOD AND APPARATUS FOR DETERMINING TRIGLYCERIDE LEVEL

[75] Inventors: Bernard G. Finkel, Spring Valley; Arthur L. Levy, Mount Vernon; Carol Keyloun, Briarcliff Manor, all of N.Y.

[73] Assignee: Scientific Specialties Ltd., Garden City, N.Y.

[22] Filed: Nov. 2, 1971

[21] Appl. No.: 194,944

[52] U.S. Cl. ............................................. 23/230 B
[51] Int. Cl. ............................................. G01n 33/16
[58] Field of Search..... 23/230 B; 252/408; 128/272

[56] References Cited
UNITED STATES PATENTS
2,770,601  11/1956  Weichselbaum .............. 23/230 B X
3,528,775  9/1970   O'Hara et al .................. 23/230 HC OTHER PUBLICATIONS
Folch et al., J. Biol. Chem. 226, 497 (1957).
Dole et al., J. Biol. Chem. 235, 2595 (1960).
Hackh's Chemical Dictionary, 4th Edn., McGraw Hill, 1969, pages 619, 620 relied on.
Aloe Scientific Catalog 103, 1952, pages 1020, 1070 relied on.
R. J. Henry, Clinical Chemistry, 1964, pages 866–870 relied on. RB40.H4.
N. D. Cheronis, "Organic Chemistry", 1947, pages 354–358 relied on. QD251C46.
Mason et al., Anal. Chem. 36, 587 (1964).

Primary Examiner—Robert M. Reese

[57] ABSTRACT

Blood serum is introduced into an extraction tube filled with a premeasured extraction reagent Triglycerides are selectively extracted from the serum by an extraction reagent. The extracted triglycerides are subjected to transesterification to liberate glycerol. The triglycerides are then oxidized and treated with a color-producing reagent. The amount of color is directly proportional to triglyceride concentration which can be measured by a colorimeter.

2 Claims, 4 Drawing Figures

METHOD AND APPARATUS FOR DETERMINING TRIGLYCERIDE LEVEL

BACKGROUND OF THE INVENTION

The present invention relates to a chemical method for measuring triglycerides by extracting this substance from blood serum and making it measurable by a colorimeter.

BRIEF DESCRIPTION OF THE PRIOR ART

The importance of measurement of blood levels of triglycerides, cholesterol and lipoproteins and their relationship to the study and treatment of artherosclerotic heart disease is well established. Investigators have classified the types of hyperlipidemia and indicate that the dietary management of patients could be based upon accurate information of the blood plasma concentrations of these substances.

Artherosclerotic heart disease is associated with very high concentrations of the low density fraction of serum lipoproteins consisting mainly of triglycerides. It is believed that the measurement of a patient's triglyceride level is more determinative of his condition than the cholesterol level. Statistically, high cholesterol and low triglyceride levels are seldom found among heart disease patients, but high triglyceride with normal or increasing cholesterol levels is the most common abnormality in coronary heart disease.

Triglyceride levels appear to be independent of phospholipids. Triglycerides are transported as chylomicrons and low-density lipoproteins. Although investigators have determined that triglycerides amount to approximately one-quarter of the total serum concentration, it is not recommended that triglyceride level be determined on the basis of the total lipid determination.

The prior art includes a method for estimating triglycerides based on the biological assumption that total serum lipids are comprised of phospholipids, total cholesterol and triglycerides. However, this assumption lacks veracity because free fatty acids and probably other compounds included as lipids are not considered. An additional error factor becomes manifest because any variation on the real value of one component influences the others. To indicate the range of technical errors that result from this prior art method, gravimetric measurements of total lipids, for example, have been shown to cause a ±29 mg/dl range for a triglyceride.

In recent years, several manufacturers have developed triglyceride test kits which provide convenient and compact systems for determining triglyceride level in a clinical laboratory. The kit includes a number of reagents that must be measured and mixed with blood serum to cause an initial extraction of triglycerides from the serum. Thereafter, additional reagents are added until a clear colored triglyceride solution is formed. This solution becomes amenable to colorimeteric measurement for the determination of triglyceride concentration in the original blood serum sample.

Although the prior art methods work satisfactorily, they are somewhat inconvenient to use and present the possibility of an erroneous measurement due to the requirement that reagents be manually mixed to form the original extraction reagent.

It would be preferable for a kit to be available that includes an extraction tube filled with pre-measured reagents. This would reduce the inconvenience and possibility of test error in the extraction process known as the Dole's extract method.

BRIEF DESCRIPTION OF THE PRESENT INVENTION

The present invention is a marked improvement over prior art extraction methods employing the basic Dole's extract method. Although the invention system principally employs prior art reagents, there are several novel and meritorious improvements.

Principally, the invention discloses an extraction tube that is filled with pre-measured reagents which extract triglycerides from an introduced blood serum sample. Thus, the cardinal requirement that precisely measured extraction reagents be mixed can be satisfied.

The reagents which fill the extraction tube are immiscible and normally assume two phases. However, the presently disclosed invention includes a novel method for pre-metering the immiscible phases as a single liquid mixture by using ultrasonics during mechanical stirring. As a result, a single unified mixture can be introduced into the extraction tube during a single filling procedure. The phases then separate as required.

The extraction procedure employed in the present invention can be employed for the measurement of triglycerides, cholesterol and lipoproteins. Thereafter, the addition of respective reduction reagents which make these blood substances amenable to measurement, are well known in the art and do not, per se, form the present invention.

The test procedure as outlined herein for the determination of triglycerides can be performed manually or automatically by using the widely available Technicon Inc. instrument known as the Autoanalyzer.

The proposed novel testing method and apparatus include compatible manual and automated procedures that can be followed in all clinical laboratories.

By using the inventive method herein, the clinical laboratory has a greater chance of achieving precise triglyceride measurements more conveniently and rapidly than is possible with prior art methods.

Figure 1:
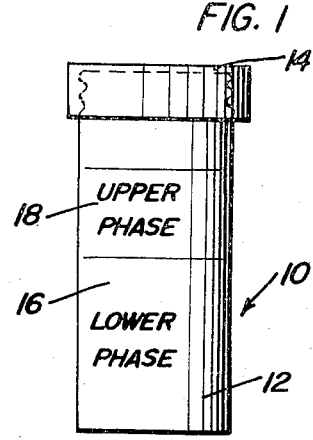
FIG. 1 is a plan view of an extraction tube as used in the present invention.

Referring to the figures and more particularly FIG. 1, the present invention makes available an extraction procedure which is novel. A ready-to-use screw cap tube 10 provides the user with a triglyceride test far more convenient and accurate than previously possible. The extraction tube 10 includes a vial portion 12 having a screw-on cap 14. The basic chemical reaction for the triglyceride extraction is prior art and is referenced by Dole and Meinertz in the Journal of Biological Chemistry 235:2595, 1960. It is to be emphasized at this point, that although the basic chemical reactions are prior art, the use of a ready-to-use extraction tube with pre-measured reagents therein is neither shown nor suggested in the prior art. To fill the extraction tube with pre-measured quantities of reagents is commercially feasible due to a novel filling method as described hereinafter.

FIG. 1 illustrates two immiscible phases that constitute the extraction reagent filling the extraction tube. The bottom layer 16 is an aqueous solution including 3.5 ml. isopropanol and 1 ml. sulfuric acid (.08 normal). The upper phase 18 is an organic, non-aqueous solution of a relatively low flammable and evaporation rate solvent known as normal nonane (Phillips Petroleum). With the aforementioned proportions in the bottom phase, the upper phase is 2.0 ml. In order to achieve repeatable precise results, it is preferable to filter the commercially available nonane over a column before use in the extraction tube. This is a mechanical filtration that removes particulate matter.

Figure 2:
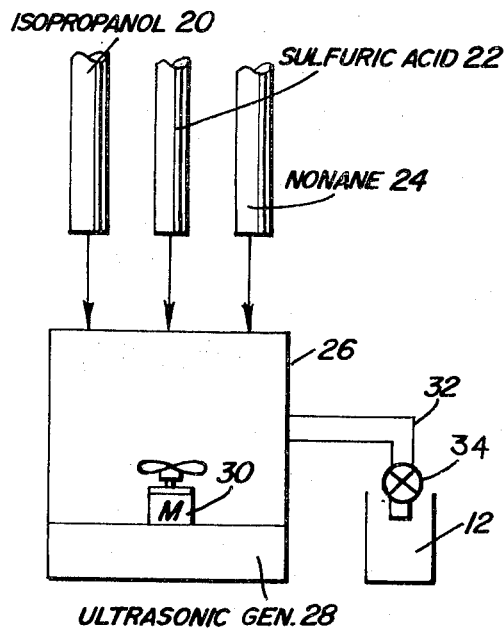
FIG. 2 is a schematic view of the apparatus for mixing immiscible liquids in metered proportions.

As previously mentioned, a novel method for metering the upper and lower phases in a single step has been perfected. FIG. 2 illustrates the apparatus for achieving the single metering step. A delivery tube 20 deposits isopropanol into a vat 26 along with sulfuric acid that is delivered from delivery tube 22. These reagents form the lower phase 16 in the extraction tube 10. Simultaneous with the delivery of isopropanol and sulfuric acid is the delivery of nonane through delivery tube 24. As these reagents are added to the vat 26, an attached ultrasonic generator 28 sonifies the reagents. In addition, mechanical mixing occurs by a motorized agitator 30. The components 28 and 30 are of conventional design and do not, per se, perform a part of the present invention. As a result of the sonification and the mechanical mixing, a suspension is produced including the reagent components isopropanol, sulfuric acid, and nonane. As a guide, it is important to realize that excess sonification produces an emulsion rather than the desired suspension.

An outlet tube 32 delivers the suspension to a vial 12 through a metering valve 32. Of course, the delivery tubes 20, 22 and 24 supply their respective reagents in the relative quantities previously enumerated. The metering valve 34 supplies the vial 12 with 6.5 ml. of the suspension. It is emphasized at this point, that the specified quantities are merely exemplary and not restrictive.

After a period of time, the lower phase 16 (FIG. 1) and upper phase 18 separates completely as totally immiscible phases as if they were separately measured and introduced in accordance with conventional procedure.

It has been found that when practicing the extraction procedure with conventional techniques the results of the tests vary somewhat as a function of how long the reagents, introduced into the extraction tube, stay before being mixed with a blood serum sample. In contradistinction, when the prefilled extraction tube 10 is received by a user, it has already obtained equilibrium. In using the extraction tube, a laboratory technician adds 0.5 ml. of serum. Then, the extraction tube is closed and shaken. Chemically, acidification of the serum occurs and coagulation of blood protein becomes evident. The coagulated proteins slowly descend into the lower phase 16 because they are not soluble in the upper phase 18.

The upper phase 18 contains nonane which dissolves fats including: the neutral triglyceride fats, cholesterol, and free fatty acids.

The isopropanol in the lower phase serves the useful function of dissolving phospholipids, which would otherwise interfere with a colorimetric measurement which takes place later in the test. The lower phase 16 includes the coagulated proteins as well as dissolved non-fats. This mixture forms a gelatinous mass.

At this point, the upper phase 18 will be clear to the eye and contains the triglycerides, cholesterol, and free fatty acids in solution.

The prior art includes methods for measuring the respective level of each of these fats from the resultant extract. Therefore, for purposes of convenience, the following test description will specifically deal with the measurements of triglycerides only.

In accordance with the manual procedure of the present invention, a transesterifying reagent must be prepared by adding isopropanol to sodium methylate. For best results, the resultant reagent should be used within 48 hours. The particular use of sodium methylate departs from the conventional transesterifying reagent because it has been discovered that use of this reagent can be allowed in both the manual procedure and the automated procedure set forth hereinafter. Becaue of the instability of sodium methylate, it is packaged in a novel manner. This packaging consists of a container 36 having 50 mg. of sodium methylate powder stabilized by nitrogen gas that is contained in a sealed container.

Figure 3:
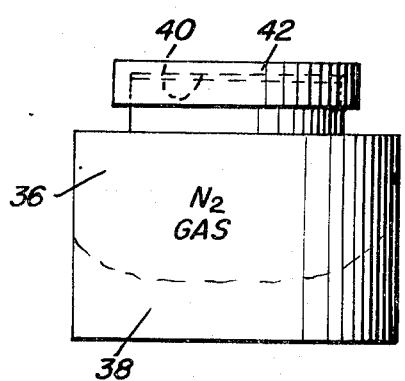
FIG. 3 is a plan view of a powder reagent stored in nitrogen.

This construction is illustrated in FIG. 3 wherein the container 36 houses the powdered reagent 38 and is stabilized by the contained nitrogen gas. A foil seal 40 is appropriately adhered to the opening of the container neck. A screw cap 42 is positioned over the seal 40. When the transesterifying reagent is to be prepared, a premeasured amount of isopropanol, specifically 100 ml. – ACS grade is introduced into container 36 after the cap 42 and foil seal 40 have been removed. The resultant reagent must be used within 48 hours.

To 3.0 ml. of the transesterifying working reagent, the clinical technician adds 0.2 ml. of the extract (upper phase 18). The solution is incubated for ten minutes at 60° C. Chemically, transesterification of the extract occurs and the triglycerides are converted to glycerol. Use of a premeasured amount of stabilized sodium methylate ensures complete transesterification, yet the amount is not in such excess to disturb the clarity of the transesterified solution.

A working color reagent is prepared by adding acetylacetone to ammonium acetate (2 M solution) in the ratio of 1.0 ml. to 100 ml. This solution should stand for one hour before use.

To the extract the technician adds 0.1 ml. of the oxidizing reagent sodium metaperiodate and 1.0 ml. of the working color reagent ammonium acetate (2 M solution). The mixture is incubated again as in the previously discussed step. Chemically, at this point, glycerol which is liberated from triglycerides by transesterification is then oxidized with the sodium metaperiodate to form formadehyde. formaldehyde.

Color develops with acetylacetone in buffer. The color manifests itself as a clear yellow solution which is principally comprised from a resulting chromic acid.

As a final step, colorimetric readings are made at 412 nm. vs. Reagent Blank (405–420 nm. is satisfactory).

The degree of yellow coloration is proportional to the triglyceride level in the original blood serum sample.

The colorimetric calculation is made as follows:
OD Unknown
  × Conc. Std = mg % Unknown OD Standard The colorimetric test is conventional. Briefly, a reading is made on a blank which includes a clear solution in which no reactions have taken place. This reading is compared to a reading obtained from the finally reacted solution which is colored yellow. The reading difference is compared to a standard which may be trioleon which is a neutral fat related to triglyceride. The blank and standard extracts are treated as unknowns throughout the test procedure.

The automated version of the present invention still requires the manual extraction procedure. However, after a triglyceride extract is obtained, automation can complete the test. Rather than using 0.2 ml. of the extract, for the automated procedure, the clinical technician uses as much of the extract as he can obtain from the extract tube.

Figure 4:
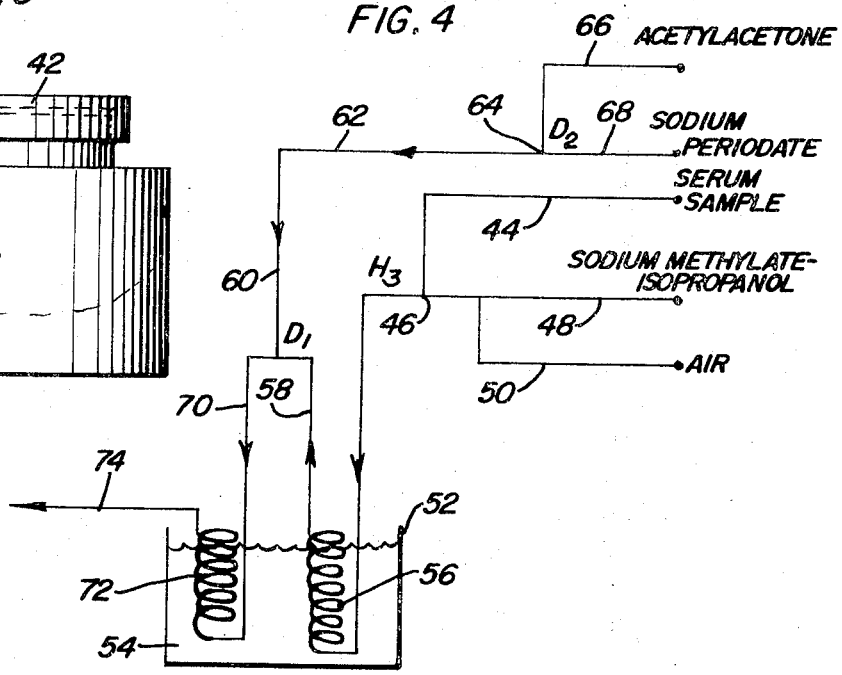
FIG. 4 is a flow diagram for an automated procedure for measuring triglycerides.

The extract is then deposited in a cup (not shown) that is conventional with the Technicon Autoanalyzer. From this point on, the chemical reactions as previously described in the manual process are accomplished in the flow system of the Autoanalyzer by automatically metering and mixing reagents. Also, incubation is performed automatically. FIG. 4 schematically illustrates the flow system employed in the automated procedure. As one skilled in the art will note, the nomenclature is conventional and refers to the Technicon Autoanalyzer.

The serum sample from a patient is introduced into the Autoanalyzer instrument through line 44. The line 44 terminates at an $H_3$ cactus 46 where the serum is mixed with an air sample flowing through line 50, and a premeasured transesterifying solution of isopropanol and sodium methylate flowing along line 48 in the proportions previously discussed. The cactus $H_3$ at 46 must lie flat for a proper bubble pattern. As will be observed, the cactus at 46 serves as a mixing point for lines 44, 48 and 50. A cactus is a coupling having several branches that connect delivery lines carrying chemicals to be mixed.

Up to this point, the intermixing of chemicals is the same for either the manual or automatic procedure.

The transesterified solution then flows out of the cactus at 46 and into a heating bath 52 that serves to incubate the solution for a period equivalent to the incubation period of the manual procedure. More particularly, the solution is conducted to a reaction coil 56 which is immersed in a heated liquid 54 that is maintained at a temperature of 50°C. After passing through the reaction coil 56, the incubated solution flows through line 58 and into cactus $D_1$ at 60. It is noted that the reaction coil 56 is fabricated from a 40 foot length of polyethylene. It has been found that the polyethylene reaction coil performs more satisfactorily than the conventional glass reaction coil of the Technicon Autoanalyzer. The polyethylene material appears to have a repulsion characteristic that prevents the solution flowing therethrough from clinging to the wall of the coil. A capillary sidearm 62 connects the cactus $D_1$ at 60 to another cactus $D_2$ at 64. The latter mentioned cactus lies flat for proper bubble pattern and joins a first delivery tube 66 that supplies acetylacetone reagent. A second delivery tube 68 is joined to the cactus at 64 and delivers sodium periodate. Thus, reagents in lines 66 and 68 are mixed at the cactus $D_1$ (60) with the incubated transesterified triglycerides. The resultant solution is then fed through tubing 70 to a second reaction coil 72 that is immersed in the heating bath 52. The reaction coil 72 is fabricated from a 20 foot length of polyethylene. The liquid flowing through the reaction coil 72 is equivalent to the second incubation of the manual procedure. The resultant solution exhibits yellow coloration and is automatically delivered through line 74 to a colorimeter. The colorimeter is employed as previously described to provide a measurement of triglyceride level in the original serum sample. Measurements are made at 409–18–28 nm. or 410–18–20 nm.

Accordingly, from the aforementioned descriptions of the manual and automated procedures, it can be appreciated that the same chemistry applies to both procedures. This is important for the clinical laboratory that initially operates with the manual procedure. Then, as the workload increases, this same laboratory can switch to the automated procedure without having to retrain personnel and undergo a development period.

It should be pointed out that the present invention is compatible for both blood serum and plasma. However, the aforementioned description has been set forth in terms of a serum sample because most clinical laboratories operate with serum.

It should be understood that the invention is not limited to the exact details of construction shown and described herein for obvious modifications will occur to persons skilled in the art.

Wherefore we claim:

1. A method for analyzing triglyceride level in an extracted triglyceride solution comprising the steps:

filling an extraction tube with premeasured reagents including nonane to form an upper phase, and an aqueous acidic solution to form a lower phase;

introducing a preselected sample quantity of blood serum into the extraction tube;

mixing the resulting contents of the tube for acidifying the serum resulting in the coagulating of blood protein which transfers to the lower phase due to its insolubility in the upper phase, dissolving of phospholipids from the serum simultaneously occurring in the lower phase;

dissolving fats including triglycerides in the upper phase;

mixing the upper phase with a preselected amount of isopropanol in a container originally filled with a premeasured amount of sodium methylate stabilized in nitrogen gas, the premeasured amount being sufficient to complete transesterification of the upper phase but not in such excess to disturb light transmissivity through a resulting solution;

incubating the mixture to complete transesterification thereof which liberates glycerol;

mixing the transesterified solution with a glycerol oxidizing reagent and a working color reagent in preselected amounts;

incubating the transesterified solution to complete the oxidation of the glycerol and to develop color in a clear solution that is proportional to the triglyceride level in the original serum.

2. The method set forth in claim 1, wherein the step of filling an extraction tube with premeasured reagents is facilitated by including the preparatory steps of subjecting the reagents, which are ordinarily immiscible, to ultrasonic energy sufficient to cause a suspension of one reagent within the other; and mechanically mixing the liquids during sonification for improving the uniformity of the suspension.

* * * * *